US012763231B2

(12) United States Patent
Suzuki et al.

(10) Patent No.: US 12,763,231 B2
(45) Date of Patent: Oct. 13, 2026

(54) INSULATED ELECTRIC WIRE AND MANUFACTURING METHOD OF INSULATED ELECTRIC WIRE

(71) Applicant: Proterial, Ltd., Tokyo (JP)

(72) Inventors: Hideyuki Suzuki, Tokyo (JP); Naoto Teraki, Tokyo (JP); Masamichi Kishi, Tokyo (JP); Seiichi Kashimura, Tokyo (JP); Kazufumi Suenaga, Tokyo (JP); Kanako Suganuma, Tokyo (JP)

(73) Assignee: Proterial, Ltd., Tokyo (JP)

( * ) Notice: Subject to any disclaimer, the term of this patent is extended or adjusted under 35 U.S.C. 154(b) by 163 days.

(21) Appl. No.: 18/609,386

(22) Filed: Mar. 19, 2024

(65) Prior Publication Data

US 2024/0321480 A1 Sep. 26, 2024

(30) Foreign Application Priority Data

Mar. 22, 2023 (JP) ................................ 2023-045018

(51) Int. Cl.
*H01B 3/02* (2006.01)
*C10M 119/22* (2006.01)
(Continued)

(52) U.S. Cl.
CPC ............. *H01B 3/02* (2013.01); *C10M 119/22* (2013.01); *C10M 2213/0606* (2013.01);
(Continued)

(58) Field of Classification Search
CPC ...... H01B 3/0291; H01B 3/004; H01B 3/006; H01B 3/10; H01B 3/141; H01B 3/2813; H01B 3/305; H01B 3/306; H01B 3/308; H01B 3/42; H01B 3/445; H01B 7/02; H01B 7/04; H01B 11/22; H01B 13/065; H01R 1/1033; H01R 3/00
(Continued)

(56) References Cited

U.S. PATENT DOCUMENTS

| | | | | |
|---|---|---|---|---|
| 2,313,234 A * | 3/1943 | Gavitt | H01B 7/0009 | 174/120 SR |
| 4,716,079 A * | 12/1987 | Sano | C10M 107/30 | 174/120 SR |

(Continued)

FOREIGN PATENT DOCUMENTS

| | | |
|---|---|---|
| JP | H09-509783 A | 9/1997 |
| JP | H10-077446 A | 3/1998 |

(Continued)

OTHER PUBLICATIONS

"Notice of Reasons for Refusal" Office Action issued in JP 2023-045018; mailed by the Japanese Patent Office on Apr. 14, 2026.

*Primary Examiner* — William H. Mayo, III
(74) *Attorney, Agent, or Firm* — Studebaker Brackett PLLC

(57) ABSTRACT

An insulated electric wire is provided with a metal conductor, and an insulation coating layer covering an outer periphery of the metal conductor. The insulation coating layer includes a lubricant layer including fluorine-based fine particles as a lubricant as an outermost layer, and an enamel insulation layer including fluorine-based fine particles as an inner layer with respect to the lubricant layer.

19 Claims, 5 Drawing Sheets

(51) Int. Cl.
*C10N 40/32* (2006.01)
*C10N 50/00* (2006.01)

(52) U.S. Cl.
CPC . *C10M 2213/0623* (2013.01); *C10N 2040/32* (2013.01); *C10N 2050/023* (2020.05)

(58) Field of Classification Search
USPC ....... 174/36, 110 R, 110 SR, 110 AR, 113 R, 174/117 R, 120 R, 120 C, 120 SR, 121 R, 174/121 SR; 428/375, 378, 383; 574/118, 275, 277, 278, 409; 427/118, 427/384, 424, 426
See application file for complete search history.

(56) References Cited

U.S. PATENT DOCUMENTS

| | | | | |
|---|---|---|---|---|
| 5,254,408 | A * | 10/1993 | Takeuchi | H01B 3/302 174/120 SR |
| 6,534,717 | B2 * | 3/2003 | Suzuki | C08K 5/54 174/120 C |
| 7,411,129 | B2 * | 8/2008 | Kummer | H01B 3/465 427/118 |
| 7,557,301 | B2 * | 7/2009 | Kummer | B32B 27/30 |
| 7,851,705 | B2 * | 12/2010 | Obika | H01B 3/305 174/120 R |
| 8,222,525 | B2 * | 7/2012 | Powers | H02G 1/08 174/36 |
| 8,927,865 | B2 * | 1/2015 | Hanawa | H01B 3/306 174/110 SR |
| 9,251,927 | B2 * | 2/2016 | Kim | H01B 7/04 |
| 2005/0118422 | A1 * | 6/2005 | Cipelli | H01B 3/306 428/375 |
| 2008/0194437 | A1 * | 8/2008 | Murase | C10M 169/04 508/108 |
| 2012/0222884 | A1 * | 9/2012 | Honda | C08K 3/36 174/120 SR |
| 2013/0266280 | A1 * | 10/2013 | Sakabe | H01R 3/00 385/101 |
| 2016/0327089 | A1 * | 11/2016 | Adam | F16C 33/128 |
| 2020/0399778 | A1 | 12/2020 | Lida et al. | |

FOREIGN PATENT DOCUMENTS

| | | | |
|---|---|---|---|
| JP | 2002-358835 | A | 12/2002 |
| JP | 2017-075424 | A | 4/2017 |
| JP | 2018-060776 | A | 4/2018 |
| JP | 2019-096605 | A | 6/2019 |
| WO | 95/24044 | A1 | 9/1995 |

* cited by examiner

INSULATED ELECTRIC WIRE AND MANUFACTURING METHOD OF INSULATED ELECTRIC WIRE

CROSS-REFERENCE TO RELATED APPLICATIONS

The present application is based on Japanese patent application No. 2023-045018 filed on Mar. 22, 2023, the entire contents of which are incorporated herein by reference.

TECHNICAL FIELD

The present invention relates to an insulated electric wire that is configured by covering the outer periphery of a metal conductor with an insulation coating layer and a manufacturing method of the insulated electric wire.

BACKGROUND OF THE INVENTION

Conventionally, some of the enameled wires that are configured by forming an enamel layer on a conductor wire have improved self-lubricating properties. The applicant of the present invention proposes enameled wires that are described in Patent Literatures 1 and 2 as self-lubricating enameled wires.

The self-lubricating enameled wire that is described in Patent Literature 1 has a lubricant layer that is made by mixing wax and silane coupling agent into a polyamide resin as an outer layer of an enamel coating layer formed onto a conductor wire. The self-lubricating enameled wire that is described in Patent Literature 2 has a polyamide-imide resin varnish that is coated and baked so that it has a thickness of 3 to 4 μm as an outer layer of a polyester imide enamel coating layer formed onto a conductor wire.

CITATION LIST

Patent Literature 1: JP2002-358835A
Patent Literature 2: JPH10-77446A

SUMMARY OF THE INVENTION

Some application uses of enameled wires may require improved slipperiness, e.g., in the case where a plurality of enameled wires is arranged inside a fine tube and repeatedly bent. Also, when forming an outermost layer with high solid lubrication on an enameled wire to improve slipperiness, it is necessary that the layers have high adhesion strength so that the outermost layer is not easily peeled off. Also, the "slipperiness" here means a quality that a wire slips easily against other objects when the wire contacts it.

The object of the present invention is to provide an insulated electric wire with high slipperiness and a highly strong insulation coating layer and its manufacturing method.

To solve the above-mentioned problem, one aspect of the present invention provides an insulated electric wire, comprising:

a metal conductor; and an insulation coating layer covering an outer periphery of the metal conductor, wherein the insulation coating layer comprises a lubricant layer including fluorine-based fine particles as a lubricant as an outermost layer, and an enamel insulation layer including fluorine-based fine particles as an inner layer with respect to the lubricant layer.

Further, another aspect of the present invention provides a manufacturing method of the insulated electric wire according to the aspect of the present invention, comprising: forming the lubricant layer by adhering a dispersion liquid, including the fluorine-based fine particles dispersed into a liquid dispersion medium, onto an outer periphery of the enamel insulation layer, and drying and baking the dispersion liquid.

Advantageous Effects of the Invention

According to the present invention, it is possible to provide an insulated electric wire having high slipperiness and a highly strong insulation coating layer, and its manufacturing method.

DETAILED DESCRIPTION OF THE INVENTION

First Embodiment

Figure 1:
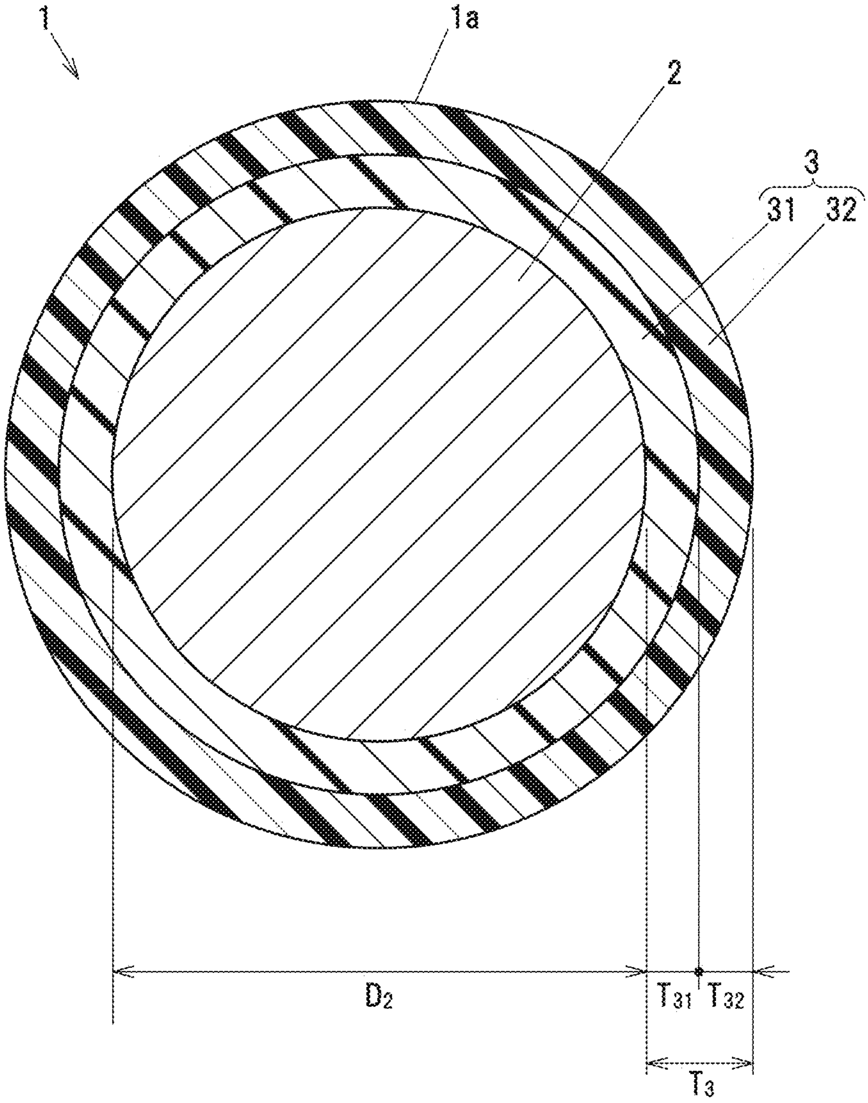
FIG. 1 is a cross-sectional view of an insulated electric wire according to a first embodiment.

FIG. 1 is a cross-sectional view of an insulated electric wire according to the first embodiment of the present invention. The insulated electric wire 1 includes a metal conductor 2 in the form of wire and an insulation coating layer 3 covering the outer periphery of the metal conductor 2. The insulation coating layer 3 has electrical insulating properties.

The metal conductor 2 is composed of an alloy that includes at least one of the highly conductive metal elements, copper, silver, and aluminum, or composed of a single metal, either copper, silver, or aluminum. Additionally, a plated wire with tin or other metals plating on the surface of a core composed of the alloy or single metal mentioned above, e.g., or a clad wire wherein dissimilar metals are rolled and joined on the surface of the core may be used as the metal conductor 2. In the present embodiment, the metal conductor 2 has a circular cross-section, and an outer diameter $D_2$ of the conductor is 10 μm or more and 50 μm or less.

The insulation coating layer 3 has a double-layer structure that is composed of an enamel insulation layer 31 and a lubricant layer 32. The enamel insulation layer 31 is formed on the metal conductor 2, and the lubricant layer 32 is formed directly on the enamel insulation layer 31. The lubricant layer 32 is an outermost layer of the insulation coating layer 3, and the enamel insulation layer 31 is an inner layer with respect to the lubricant layer 32. A thickness $T_3$ of the entire insulation coating layer 3 is 3 μm or more and 10 μm or less. A thickness $T_{31}$ of the enamel insulation layer 31 and a thickness $T_{32}$ of the lubricant layer 32 are both 1 μm or more and 8 μm or less. Furthermore, each of these thicknesses $T_3$, $T_{31}$, and $T_{32}$ is a mean thickness that is measured at multiple locations (e.g., four locations) on each layer. The thickness of each layer can be measured, e.g., by a SEM image (e.g. magnification 1000×) of a cross-section perpendicular to longitudinal direction of the insulated electric wire 1.

The lubricant layer 32 has fluorine-based fine particles as a lubricant, which decreases a coefficient of friction on an outer surface 1*a* of the insulated electric wire 1, enhancing the slipperiness of the insulated electric wire 1. In addition, the enamel insulation layer 31 includes fluorine-based fine particles of the same kind as in the lubricant layer 32. The main component of the lubricant layer 32 is fluorinated resin, and the content of fluorinated resin per volume is higher than that of the enamel insulation layer 31. Also, the lubricant layer 32 may be consisting of fluorinated resin.

The fluorine-based fine particles in the enamel insulation layer 31 and the lubricant layer 32 can be manufactured, e.g., by emulsion polymerization or pulverization method. An average particle size of the fluorine-based fine particles is, e.g., 1.0 μm or less. It is particularly preferable that an average particle size of the fluorine-based fine particles is 0.2 μm or more and 0.5 μm or less. An average particle size of the fluorine-based fine particles is a particle diameter at 50% integration in particle size distribution obtained by laser diffraction using a particle size distribution analyzer (MT3000II) of Microtrac Corporation. In addition, the fluorine-based fine particles may or may not be crosslinked.

As the fluorine-based fine particles for the enamel insulation layer 31 and the lubricant layer 32, fine particles of polytetrafluoroethylene (PTFE) or fine particles of perfluoroalkoxyalkane (PFA) may be used appropriately. When the fluorine-based fine particles of the lubricant layer 32 are the fine particles of polytetrafluoroethylene (PTFE), the enamel insulation layer 31 also includes the fine particles of polytetrafluoroethylene (PTFE). Also, when the fluorine-based fine particles of the lubricant layer 32 are fine particles of perfluoroalkoxyalkane (PFA), the enamel insulation layer 31 also includes fine particles of perfluoroalkoxyalkane (PFA).

With this configuration, the fluorine-based fine particles of the enamel insulation layer 31 and the fluorine-based fine particles of the lubricant layer 32 are tightly bonded, and the adhesion strength of the lubricant layer 32 to the enamel insulation layer 31 is enhanced. Also, peeling off the lubricant layer 32 from the enamel insulation layer 31 is deterred when the insulated electric wire 1 rubs against surrounding components.

The percentage of the fluorine-based fine particles in the enamel insulation layer 31 is 0.5 wt % or more and 60.0 wt % or less. This is because the effect of increasing the adhesion strength to the lubricant layer 32 may not be enough if the percentage is less than 0.5 wt %, and the fluorine-based fine particles of the enamel insulation layer 31 may easily fall off if the percentage exceeds 60.0 wt %. Moreover, from the viewpoint of preventing a decrease in withstand voltage and ensuring sufficient withstand voltage while improving the adhesive strength of the enamel insulation layer 31, it is preferable that the fluorine content in the enamel insulation layer 31 be 1.0 wt % or more and 20 wt % or less. Also, the percentage of the fluorine-based fine particles in the enamel insulation layer 31 can be measured, e.g., by Energy Dispersive X-ray Fluorescence Analyzer (EDX). The fluorine content detected by the EDX is, e.g., 0.5 wt % or more and 45.6 wt % or less.

Figure 2:
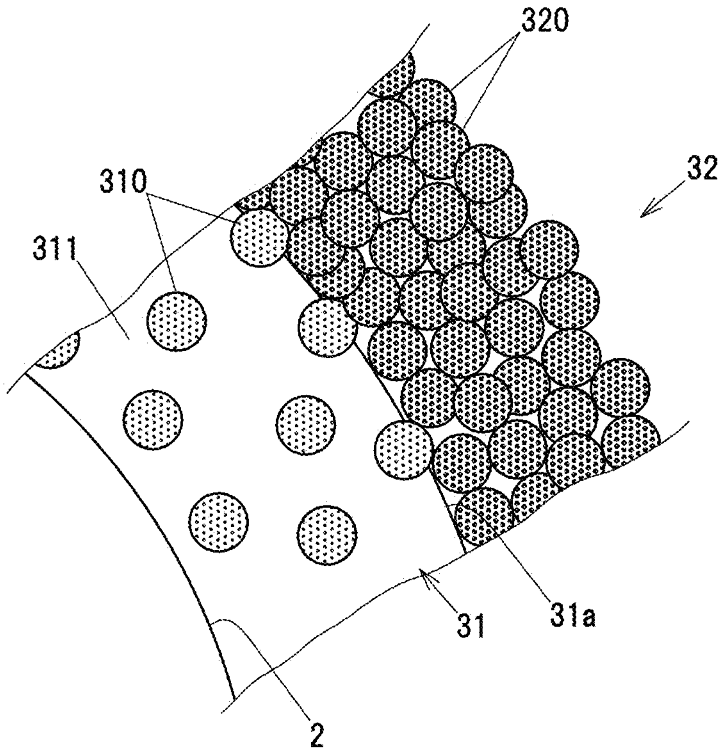
FIG. 2 is an explanatory diagram for explaining the adhesion between an enamel insulation layer and a lubricant layer.

FIG. 2 is an enlarged view of the boundary area between the enamel insulation layer 31 and the lubricant layer 32, explaining the adhesion between the enamel insulation layer 31 and the lubricant layer 32. The fine particles of polytetrafluoroethylene (PTFE) and the fine particles of perfluoroalkoxyalkane (PFA) have actually irregular forms in various sizes and shapes, but FIG. 2 schematically shows fluorine-based fine particles 310 of the enamel insulation layer 31 and fluorine-based fine particles 320 of the lubricant layer 32 in the form of circles.

The enamel insulation layer 31 has, e.g., a lot of fluorine-based fine particles 310 that are dispersed and mixed in a base part 311 composed of a base polymer material such as polyimide, and some of the fluorine-based fine particles 310 are exposed on an outer surface 31*a* of the enamel insulation layer 31. The fluorine-based fine particles 310 that are exposed on the outer surface 31*a* are partially buried inside the base part 311. The base part 311 is formed by baking varnish composed of imide resin.

The lubricant layer 32 is formed by the fluorine-based fine particles 320 combined with the fluorine-based fine particles 310 that are exposed on the outer surface 31*a* of the enamel insulation layer 31. The enamel insulation layer 31, intervening between the metal conductor 2 and the lubricant layer 32, functions as a primer to enhance the strength of the insulation coating layer 3.

Figure 3:
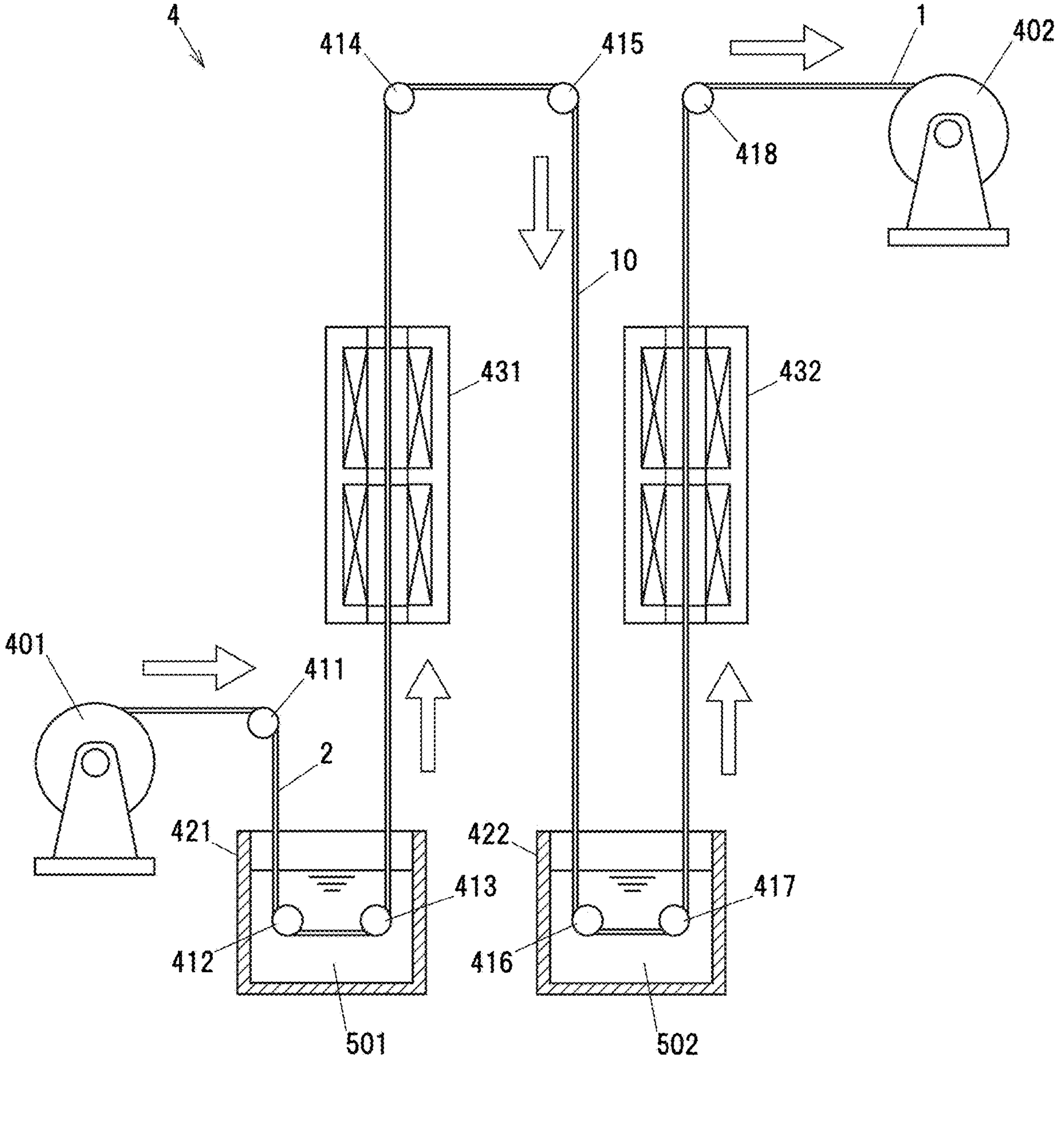
FIG. 3 is a schematic diagram illustrating a configuration example of a manufacturing device to manufacture the insulated electric wire.

FIG. 3 is a schematic diagram illustrating a configuration example of a manufacturing device 4 to manufacture the insulated electric wire 1 by forming the insulation coating layer 3 on the outer periphery of the metal conductor 2. The manufacturing device 4 is configured so that the enamel insulation layer 31 and the lubricant layer 32 are formed sequentially on the metal conductor 2, which is sent out from a feed reel 401, and the insulated electric wire 1 is reeled in by a take-up reel 402. In FIG. 3, the moving direction of the metal conductor 2 from the feed reel 401 to the take-up reel 402 is indicated by multiple arrows. Up and down in FIG. 3 correspond to vertical up and down.

The manufacturing device 4 has first to eighth guide rollers 411 to 418, first and second tanks 421 and 422, and first and second electric furnaces 431 and 432. The first tank 421 stores a mixed varnish 501 that is a liquid varnish mixed with the fluorine-based fine particles. The second guide roller 412 and the third guide roller 413 are placed inside the first tank 421.

The second tank 422 stores a dispersion liquid 502 that is a liquid dispersant (dispersion medium) in which the fluorine-based fine particles as dispersoid are dispersed. As a dispersant for the dispersion liquid 502, it is preferable to use a water-based product. The sixth guide roller 416 and the seventh guide roller 417 are placed inside the second tank 422.

The first guide roller 411 is positioned above the second guide roller 412, and the metal conductor 2 which is sent out from the feed reel 401 enters the first tank 421 by way of the first guide roller 411, and soaks in the mixed varnish 501. At that time, the mixed varnish 501 adheres to the outer periphery of the metal conductor 2. The fourth guide roller 414 is positioned above the third guide roller 413, and the first electric furnace 431 is placed between the third guide roller 413 and the fourth guide roller 414.

The fifth guide roller 415 is positioned above the sixth guide roller 416 and on the side of the fourth guide roller

414. The eighth guide roller 418 is positioned above the seventh guide roller 417, and the second electric furnace 432 is placed between the seventh guide roller 417 and the eighth guide roller 418.

The mixed varnish 501 adhered to the metal conductor 2 is heated and baked by the first electric furnace 431, and the enamel insulation layer 31 is formed. The baking temperature of the enamel insulation layer 31 is the temperature at which the base part 311 is crosslinked, and it is, e.g., 320° C. Hereinafter, the metal conductor 2 on which the enamel insulation layer 31 has been formed is called an enameled metal conductor wire 10.

The enameled metal conductor wire 10 goes toward the second tank 422 guided by the fourth guide roller 414 and the fifth guide roller 415, and soaks into the dispersion liquid 502 guided by the sixth guide roller 416 and the seventh guide roller 417. The dispersion liquid 502 adhering onto the enameled metal conductor wire 10, is dried and baked by the second electric furnace 432. At that time, the fluorine-based fine particles that are exposed on the surface of the enamel insulation layer 31 are fusion-bonded with the fluorine-based fine particles of the dispersion liquid 502, and the lubricant layer 32 is formed. The baking temperature of the lubricant layer 32 is higher than that for the enamel insulation layer 31 at the first electric furnace 431, e.g., 480° C. The insulated electric wire 1 on which the lubricant layer 32 has been formed, is guided by the eighth guide roller 418 and is reeled in by the take-up reel 402.

As described above, the manufacturing method of the insulated electric wire 1 has an enamel insulation layer forming step where the mixed varnish 501 is adhered onto the metal conductor 2 and baked to form the enamel insulation layer 31, and a lubricant layer forming step where the dispersion liquid 502 is adhered onto the outer periphery of the enamel insulation layer 31, dried, and baked, to form the lubricant layer 32. In addition, in case where the enamel insulation layer 31 is not thick enough after performing the enamel insulation layer forming step one time, the enamel insulation layer forming step may be performed multiple times to manufacture the enameled metal conductor wire 10. Also, in the case where the lubricant layer 32 is not thick enough after performing the lubricant layer forming step one time, the lubricant layer forming step may be performed multiple times to manufacture the insulated electric wire 1.

Figure 4:
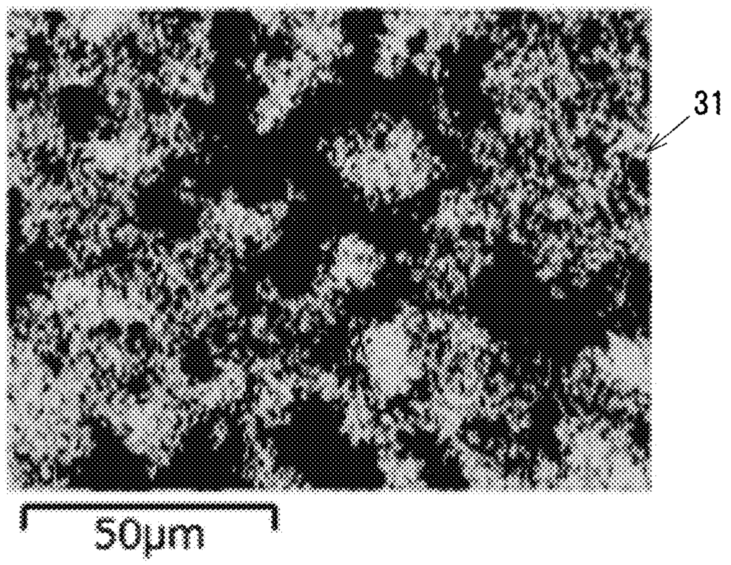
FIG. 4 is a photographic image of the surface of an insulation-coated copper plate where an enamel insulation layer is formed by performing the enamel insulation layer forming step on a copper plate.

FIG. 4 is SEM-EDS (Energy Dispersive X-ray Analysis) image of a surface of an insulation coating copper plate where the enamel insulation layer 31 has been formed by applying the enamel insulation layer forming step on a copper plate as described above. Here, the percentage of the fluorine-based fine particles (fine particles of polytetrafluoroethylene (PTFE)) in the enamel insulation layer 31 is about 40 wt %. In FIG. 4, the areas where the fluorine is distributed on the surface of the enamel insulation layer 31 are shown in light color.

When forming the lubricant layer 32 in the same manner described above on the enamel insulation layer 31, which has been formed in this way, and rubbed lightly with a finger, the lubricant layer 32 was confirmed to be more difficult to peel off.

Figure 5:
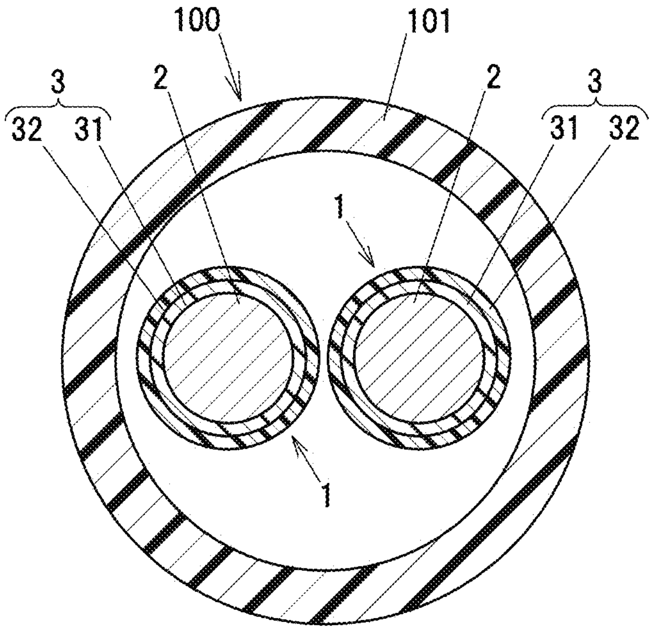
FIG. 5 is a cross-sectional view of a catheter tube having a plurality of insulated electric wires according to the first embodiment.

FIG. 5 is a cross-sectional view of a catheter tube 100 having a plurality of insulated electric wires 1 according to the present embodiment. The catheter tube 100 is configured by covering the plurality of insulated electric wires 1 by a sheath 101, and a portion in the longitudinal direction, including a tip, is inserted into a human body. Each one of the plurality of insulated electric wires 1 transmits electric signals or supplies operation power to an electronic part to be inserted into a human body.

It is preferable that the catheter tube 100 have a fine diameter to improve the minimal invasiveness and reduce the burden on an examinee. Furthermore, the catheter tube 100 is bent at multiple points while it is inserted into a human body. Therefore, it is important that the insulation coating layer 3 is not worn out due to friction, etc., when the insulated electric wires 1 are rubbed against one another inside the catheter tube 100.

The catheter tube 100 using the insulated electric wire 1, according to the present embodiment, is able to respond to such a request. Also, the insulated electric wire 1 has, e.g., the enamel insulation layer 31 as an inner layer. Therefore, even if a part of the lubricant layer 32 is peeled off due to long-time use, a short-circuit among the insulated electric wires 1 can be prevented.

In addition, in order to improve the workability of terminal processing of the catheter tube 100, it is preferable to do color coding of the plurality of the insulated electric wires 1. The color coding can be realized by adding a pigment to at least one of the enamel insulation layer 31 and the lubricant layer 32. As the pigment, it is preferable to use an inorganic pigment rather than an organic pigment to avoid deterioration by the effect of heat from sintering the lubricant layer 32. Because the lubricant layer 32 is translucent, even when only the enamel insulation layer 31 includes an inorganic pigment, the color of the enamel insulation layer 31 can be recognized from outside the lubricant layer 32 while working. Furthermore, by adding an inorganic pigment to the enamel insulation layer 31 only, the insulated electric wire 1 can be color-coded while maintaining the slipperiness of the lubricant layer 32. As the inorganic pigment, e.g., titanium oxide, iron oxide, zinc oxide may be used appropriately.

Advantageous Effects of the First Embodiment

According to the first embodiment described above, high slipperiness can be obtained because the outermost layer, that is, the lubricant layer 32 has the fluorine-based fine particles as a lubricant. Also, as explained with reference to FIG. 2, joining the fluorine-based fine particles 310 of the enamel insulation layer 31 and the fluorine-based fine particles 320 of the lubricant layer 32 enables to obtain high adhesion of the lubricant layer 32 to the enamel insulation layer 31. In other words, the present embodiment can provide the insulated electric wire 1 having high slipperiness and the insulation coating layer 3 with high strength.

In general, for an extremely fine metal conductor wire with a conductor diameter of 50 μm or less, e.g., it is difficult to melt-extrude a fluororesin of polytetrafluoroethylene (PTFE) or the like on the outer periphery. Also, if the fluororesin is melt-extruded on the outer periphery of an extremely fine metal conductor wire like the above after a thick enamel layer is formed on the outer periphery, its wire diameter becomes thick. According to the present embodiment, the formation of the insulation coating layer 3 by joining the enamel insulation layer 31 and the lubricant layer 32 enables the insulated electric wire 1 to have a small diameter and high solid lubricity, and the insulation coating layer 3 with high strength.

Modified Example of the First Embodiment

When the fluorine-based fine particles included in the enamel insulation layer 31 are fine particles of polytetrafluoroethylene (PTFE), using the fine particles of polytetrafluoroethylene (PTFE) as the fluorine-based fine particles of the lubricant layer 32 as well can enhance the adhesion of the lubricant layer 32. The lubricant layer 32 may contain a small amount of fine particles of perfluoroalkoxyalkane (PFA) (a smaller amount of the fine particles of polytetrafluoroethylene (PTFE)).

Because perfluoroalkoxyalkane (PFA) is highly heat fusible, the lubricant layer 32 containing the fine particles of perfluoroalkoxyalkane (PFA) makes the fine particles of polytetrafluoroethylene (PTFE) of the lubricant layer 32 tightly bound to one another. Therefore, it is able to prevent the lubricant layer 32 from partially peeling off, e.g., due to friction and becoming thinner, and to prevent microscopic pinholes from being created on the lubricant layer 32.

It is preferable that the percentage of the fine particles of perfluoroalkoxyalkane (PFA) in the lubricant layer 32 be, in concrete terms, 0.5 wt % or more and 5.0 wt % or less. This is because advantageous effects may not be obtained if the percentage of fine particles of perfluoroalkoxyalkane (PFA) is 0.5 wt % or less. The upper limit value for the percentage of the fine particles of perfluoroalkoxyalkane (PFA) in the lubricant layer 32 has no specific limits, but it may be, e.g., 5.0 wt % or less.

According to the modified example, the strength of the insulation coating layer 3 can be further improved, while the high slipperiness is maintained. Also, the lubricant layer 32 like this can be formed by mixing the fine particles of perfluoroalkoxyalkane (PFA) in addition to the fine particles polytetrafluoroethylene (PTFE) into the dispersion liquid 502 that is used in the lubricant layer forming step as dispersoid.

Second Embodiment

Figure 6:
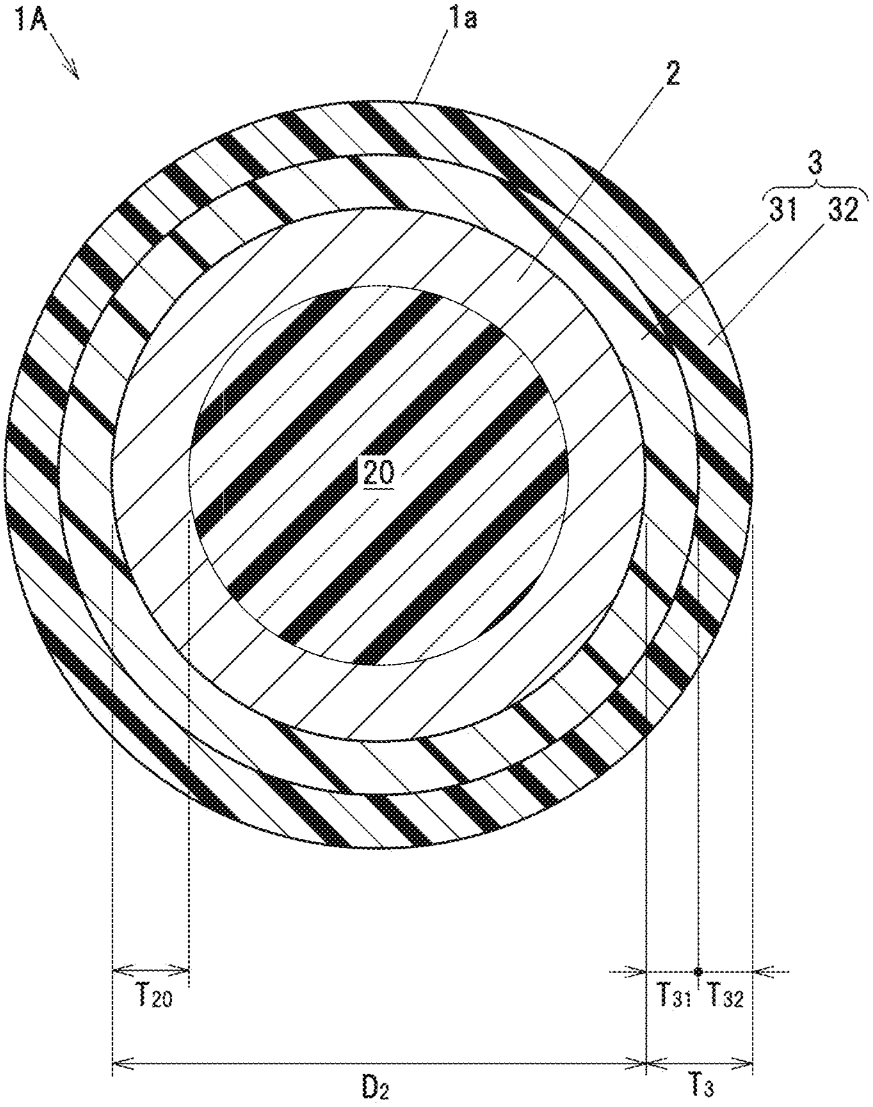
FIG. 6 is a cross-sectional view of the insulated electric wire according to a second embodiment.

FIG. 6 is a cross-sectional view of the insulated electric wire 1A according to the second embodiment of the present invention. The insulated electric wire 1A has an insulative wire 20 in a thread-like form composed of insulating material at the center, but the configuration where the outer periphery of the insulative wire 20 is covered by the metal conductor 2 is different from the insulated electric wire 1 according to the first embodiment. Other configurations and materials of the insulated electric wire 1A, the outer diameter $D_2$ of the metal conductor 2, the thickness $T_3$ of the insulation coating layer 3, the thickness $T_{31}$ of the enamel insulation layer 31, and the thickness $T_{32}$ of the lubricant layer 32, are the same as in the first embodiment. It is preferable that the outer diameter $D_2$ of the metal conductor 2 be, e.g., 10 μm to 50 μm.

As the insulative wire 20, e.g., resin fibers that can withstand fluororesin sintering temperatures such as polyester synthetic fiber, or polyamide synthetic fiber including nylon yarn can be used. The metal conductor 2 is formed by plating on the insulative wire 20. In this case, a plating thickness $T_{20}$ is, e.g., 0.2 μm or more and 5.0 μm or less. If the plating thickness $T_{20}$ is less than 0.2 μm, sufficient conductivity is not ensured, and the plating layer strength is small and easily cracked, which may cause poor conduction. Also, it is difficult to form a plating with the plating thickness $T_{20}$ larger than 5.0 μm, and moreover, the plating layer with the plating thickness larger than 5.0 μm is hard and easily cracked, which may cause poor conduction.

According to the second embodiment, the insulated electric wire 1A having high slipperiness and the insulation coating layer 3 with high strength can be obtained as in the first embodiment. Furthermore, the manufacturing cost can be reduced compared with a case where the metal conductor 2 having the outer diameter $D_2$ of 50 μm or less is formed by wire drawing.

Summary of the Embodiments

Next, technical ideas understood from the above embodiments are described with reference to the reference numerals and the like used in the embodiments. However, each reference numeral in the following description does not limit the constituent elements in the scope of claims to the members and the like specifically shown in the embodiments.

According to the first feature, an insulated electric wire 1, 1A includes a metal conductor 2; and an insulation coating layer 3 covering an outer periphery of the metal conductor 2, wherein the insulation coating layer 3 includes a lubricant layer 32 including fluorine-based fine particles 320 as a lubricant as an outermost layer, and an enamel insulation layer 31 including fluorine-based fine particles 310 as an inner layer with respect to the lubricant layer 32.

According to the second feature, in the insulated electric wire 1, 1A, as described by the first feature, the fluorine-based fine particles 320 of the lubricant layer 32 and the fluorine-based fine particles 310 of the enamel insulation layer 31 are of a same kind.

According to the third feature, in the insulated electric wire 1, 1A, as described by the second feature, the fluorine-based fine particles 320 of the lubricant layer 32 and the fluorine-based fine particles 310 of the enamel insulation layer 31 are fine particles of polytetrafluoroethylene or fine particles of perfluoroalkoxyalkane.

According to the fourth feature, in the insulated electric wire 1, 1A, as described by the third feature, a percentage of the fluorine-based fine particles 310 in the enamel insulation layer 31 is 0.5 wt % or more and 60.0 wt % or less.

According to the fifth feature, in the insulated electric wire 1, 1A, as described by any one of the first to third features, the fluorine-based fine particles 310 of the enamel insulation layer 31 are the fine particles of polytetrafluoroethylene, and the lubricant layer 32 includes the fine particles of perfluoroalkoxyalkane in addition to the fine particles of polytetrafluoroethylene as the fluorine-based fine particles 320.

According to the sixth feature, in the insulated electric wire 1, 1A, as described by the fifth feature, a percentage of the fine particles 320 of perfluoroalkoxyalkane in the lubricant layer 32 is 0.5 wt % or more and 5.0 wt % or less.

According to the seventh feature, in the insulated electric wire 1, 1A, as described by the first feature, an outer diameter $D_2$ of the metal conductor 2 is 10 μm or more and 50 μm or less, a thickness $T_3$ of the insulation coating layer 3 is 3 μm or more and 10 μm or less, a thickness $T_{32}$ of the lubricant layer 32 is 1 μm or more and 8 μm or less, and a thickness $T_{31}$ of the enamel insulation layer 31 is 1 μm or more and 8 μm or less.

According to the eighth feature, the insulated electric wire 1, 1A, as described by first feature, further includes an insulative wire 20 in a thread-like form, wherein an outer periphery of the insulative wire 20 is coated with the metal conductor 2.

According to the ninth feature, in the insulated electric wire 1, 1A, as described by the first or eighth feature, the metal conductor 2 is composed of an alloy including at least one of copper, silver, and aluminum, or composed of a single metal.

According to the tenth feature, in the insulated electric wire 1, 1A, as described by the first or eighth feature, the metal conductor 2 composed of an alloy including at least one of copper, silver, and aluminum, or composed of a single metal is plated on a surface.

According to the eleventh feature, a manufacturing method of the insulated electric wire 1, 1A as described by the first feature, includes forming the lubricant layer 32 by adhering a dispersion liquid 502, including the fluorine-based fine particles 320 dispersed into a liquid dispersion medium, onto an outer periphery of the enamel insulation layer 31, and drying and baking the dispersion liquid 502.

That is all for the description of the first and second embodiments and the variant of the present invention, but the description does not limit the invention according to the scope of claims. Additionally, it should be noted that not all combinations of features described in the first and second embodiments and the variant are essential to the means for solving problems of the invention. For example, in the first embodiment, a case where a plurality of insulated electric wires 1 are used for the catheter tube 100, but a usage of the insulated electric wire 1 and the insulated electric wire 1A is not limited to this.

The invention claimed is:

1. An insulated electric wire, comprising:

a metal conductor; and an insulation coating layer covering an outer periphery of the metal conductor, wherein the insulation coating layer comprises a lubricant layer including fluorine-based fine particles as a lubricant as an outermost layer, and a single enamel insulation layer including fluorine-based fine particles as an inner layer with respect to the lubricant layer such that every layer of the insulation coating layer includes fluorine-based fine particles.

2. The insulated electric wire, according to claim 1, wherein the fluorine-based fine particles of the lubricant layer and the fluorine-based fine particles of the enamel insulation layer are of a same kind.

3. The insulated electric wire, according to claim 2, wherein the fluorine-based fine particles of the lubricant layer and the fluorine-based fine particles of the enamel insulation layer are fine particles of polytetrafluoroethylene or fine particles of perfluoroalkoxyalkane.

4. The insulated electric wire, according to claim 3, wherein a percentage of the fluorine-based fine particles in the enamel insulation layer is 0.5 wt % or more and 60.0 wt % or less.

5. The insulated electric wire, according to claim 2, wherein the lubricant layer is formed directly on the enamel insulation layer, and the lubricant layer is formed by the fluorine-based fine particles combined with the fluorine-based fine particles that are exposed on the outer surface of the enamel insulation layer.

6. The insulated electric wire, according to claim 1, wherein an outer diameter of the metal conductor is 10 μm or more and 50 μm or less, a thickness of the insulation coating layer is 3 μm or more and 10 μm or less, a thickness of the lubricant layer is 1 μm or more and 8 μm or less, and a thickness of the enamel insulation layer is 1 μm or more and 8 μm or less.

7. The insulated electric wire, according to claim 1, further comprising: an insulative wire in a thread-like form, wherein an outer periphery of the insulative wire is coated with the metal conductor.

8. The insulated electric wire, according to claim 1, wherein the metal conductor is composed of an alloy including at least one of copper, silver, and aluminum, or composed of a single metal.

9. The insulated electric wire, according to claim 1, wherein the metal conductor composed of an alloy including at least one of copper, silver, and aluminum, or composed of a single metal is plated on a surface.

10. A manufacturing method of the insulated electric wire according to claim 1, comprising: forming the lubricant layer by adhering a dispersion liquid, including the fluorine-based fine particles dispersed into a liquid dispersion medium, onto an outer periphery of the enamel insulation layer, and drying and baking the dispersion liquid.

11. The manufacturing method according to claim 10, wherein the baking temperature of the lubricant layer is higher than that for the enamel insulation layer.

12. The insulated electric wire, according to claim 1, wherein the fluorine-based fine particles in the enamel insulation layer bind with the fluorine-based fine particles in the lubricant layer such that the enamel insulation layer functions as a primer for the lubricant layer.

13. The insulated electric wire, according to claim 12, wherein the lubricant layer is formed directly on the enamel insulation layer, and the lubricant layer is formed by the fluorine-based fine particles combined with the fluorine-based fine particles that are exposed on the outer surface of the enamel insulation layer.

14. The insulated electric wire, according to claim 1, wherein the fluorine content in the enamel insulation layer 31 is 1.0 wt. % or more and 20 wt. % or less.

15. The insulated electric wire, according to claim 1, wherein some fluorine-based fine particles are exposed on an outer surface of the enamel insulation layer and are partially buried inside the enamel insulation layer.

16. The insulated electric wire, according to claim 1, wherein the single enamel insulation layer directly contacts the metal conductor on an inner side surface and directly contacts the insulation coating layer on an outer side surface.

17. An insulated electric wire, comprising:

a metal conductor; and an insulation coating layer covering an outer periphery of the metal conductor, wherein the insulation coating layer comprises a lubricant layer including fluorine-based fine particles as a lubricant as an outermost layer, and an enamel insulation layer including fluorine-based fine particles as an inner layer with respect to the lubricant layer, wherein the fluorine-based fine particles of the enamel insulation layer are the fine particles of polytetrafluoroethylene, and the lubricant layer includes the fine particles of perfluoroalkoxyalkane in addition to the fine particles of polytetrafluoroethylene as the fluorine-based fine particles, and wherein a percentage of the fine particles of perfluoroalkoxyalkane in the lubricant layer is 0.5 wt % or more and 5.0 wt % or less.

18. An insulated electric wire, comprising:

a metal conductor; and a single insulation coating layer covering an outer periphery of the metal conductor, wherein the insulation coating layer comprises a lubricant layer including fluorine-based fine particles as a lubricant as an outermost layer, and an enamel insulation layer including fluorine-based fine particles as an inner layer with respect to the lubricant layer wherein the average particle size of the fluorine-based fine particles is 1.0 μm or less.

19. The insulated electric wire, according to claim 18, wherein the average particle size of the fluorine-based fine particles is 0.2 μm or more and 0.5 μm or less.

* * * * *